(12) United States Patent
Ryan

(10) Patent No.: US 8,881,663 B2
(45) Date of Patent: Nov. 11, 2014

(54) CLOSING TOOL

(75) Inventor: John William Ryan, Jandakot (AU)

(73) Assignee: Ausplow Pty. Ltd., Jandakot (AU)

( * ) Notice: Subject to any disclaimer, the term of this patent is extended or adjusted under 35 U.S.C. 154(b) by 415 days.

(21) Appl. No.: 13/076,706

(22) Filed: Mar. 31, 2011

(65) Prior Publication Data

US 2011/0266013 A1 Nov. 3, 2011

(30) Foreign Application Priority Data

Mar. 31, 2010 (AU) ................................ 2010901352

(51) Int. Cl.
*A01C 5/00* (2006.01)

(52) U.S. Cl.
USPC ............ 111/190; 172/194; 172/719; 172/772

(58) Field of Classification Search
USPC .......... 172/193, 716, 719, 772, 194; 111/190, 111/197
See application file for complete search history.

(56) References Cited

U.S. PATENT DOCUMENTS

| | | | |
|---|---|---|---|
| 203,207 A * | 4/1878 | Springer | 111/190 |
| 211,601 A * | 1/1879 | Springer | 111/190 |
| 221,004 A * | 10/1879 | Strayer | 111/190 |
| 252,265 A * | 1/1882 | Scofield | 111/197 |
| 322,841 A | 7/1885 | Miskimen | |
| 331,753 A * | 12/1885 | Arnett | 111/84 |
| 356,340 A * | 1/1887 | Valentine | 111/190 |
| 557,046 A * | 3/1896 | Bidwell | 111/190 |
| 676,476 A * | 6/1901 | Secor | 172/701 |
| 721,306 A * | 2/1903 | Hutcherson | 111/62 |
| 886,665 A * | 5/1908 | Taylor | 111/190 |
| 998,060 A * | 7/1911 | Weikeet | 111/190 |
| 1,006,771 A * | 10/1911 | Metzler | 111/187 |
| 1,021,042 A * | 3/1912 | Heylman | 111/190 |
| 1,031,167 A * | 7/1912 | Bushnell | 111/197 |
| 1,104,602 A * | 7/1914 | Akers | 111/190 |
| 1,229,194 A * | 6/1917 | Patric | 111/186 |
| 1,233,010 A * | 7/1917 | Altgelt | 111/62 |
| 1,643,414 A * | 9/1927 | Maze et al. | 111/190 |
| 1,693,318 A * | 11/1928 | Shell | 111/190 |
| 2,357,760 A | 9/1944 | Peacock | |
| 2,736,279 A * | 2/1956 | Johnston | 111/125 |
| 2,861,527 A | 11/1958 | Phillips | |
| 2,963,998 A | 12/1960 | Bliss | |
| 3,148,644 A | 9/1964 | Keeton | |
| 3,175,622 A * | 3/1965 | Stam | 172/159 |
| 3,307,508 A | 3/1967 | Russell | |
| 3,536,145 A * | 10/1970 | Clark | 172/710 |
| 3,598,069 A * | 8/1971 | Hatcher et al. | 111/190 |
| 3,673,970 A | 7/1972 | Hatcher | |
| 3,773,224 A | 11/1973 | Winslow | |
| 3,815,528 A * | 6/1974 | Hawkins | 111/190 |
| 3,880,100 A * | 4/1975 | Gillies et al. | 111/190 |

(Continued)

FOREIGN PATENT DOCUMENTS

| | | |
|---|---|---|
| AU | 541415 | 1/1985 |
| AU | 675376 | 1/1997 |

*Primary Examiner* — Jamie L McGowan
(74) *Attorney, Agent, or Firm* — Fitch, Even, Tabin & Flannery LLP

(57) ABSTRACT

A closing tool to be attached to a plough frame to engage a soil layer, the tool includes an attachment stem via which the closing tool is attached to the plough frame. Secured to the lower portion of the stem are wear resistant members.

20 Claims, 4 Drawing Sheets

(56) References Cited

U.S. PATENT DOCUMENTS

| | | |
|---|---|---|
| 3,976,017 A | 8/1976 | Leffler, Jr. |
| 4,023,510 A | 5/1977 | Sorlie et al. |
| 4,043,281 A | 8/1977 | Sorlie et al. |
| 4,422,392 A | 12/1983 | Dreyer et al. |
| 4,520,742 A | 6/1985 | Anderson |
| 4,762,075 A | 8/1988 | Halford |
| 4,766,962 A | 8/1988 | Frase |
| 4,798,151 A | 1/1989 | Rodrigues |
| 4,895,086 A | 1/1990 | Tye, III |
| 5,025,736 A * | 6/1991 | Anderson ............ 111/152 |
| 5,161,472 A | 11/1992 | Handy |
| 5,224,555 A * | 7/1993 | Bain et al. ............ 172/772.5 |
| 5,310,009 A * | 5/1994 | Rowlett ............ 172/723 |
| 5,331,907 A | 7/1994 | Beaujot |
| 5,396,851 A | 3/1995 | Beaujot |
| 5,417,293 A | 5/1995 | Leader |
| 5,425,318 A * | 6/1995 | Keeton ............ 111/197 |
| 5,562,054 A | 10/1996 | Ryan |
| 5,579,852 A | 12/1996 | Woodward et al. |
| 5,906,166 A | 5/1999 | Wagner |
| 6,142,085 A | 11/2000 | Drever et al. |
| 6,178,901 B1 * | 1/2001 | Anderson ............ 111/197 |
| 6,283,050 B1 * | 9/2001 | Schaffert ............ 111/150 |
| 6,945,182 B1 | 9/2005 | Haukaas et al. |
| 6,955,131 B2 | 10/2005 | Beaujot et al. |
| 7,104,205 B2 | 9/2006 | Beaujot |
| 8,220,559 B2 | 7/2012 | Ryan |
| 2004/0211346 A1 | 10/2004 | Beaujot et al. |
| 2009/0014191 A1 | 1/2009 | Ryan |
| 2009/0084295 A1 * | 4/2009 | Schaffert ............ 111/129 |

\* cited by examiner

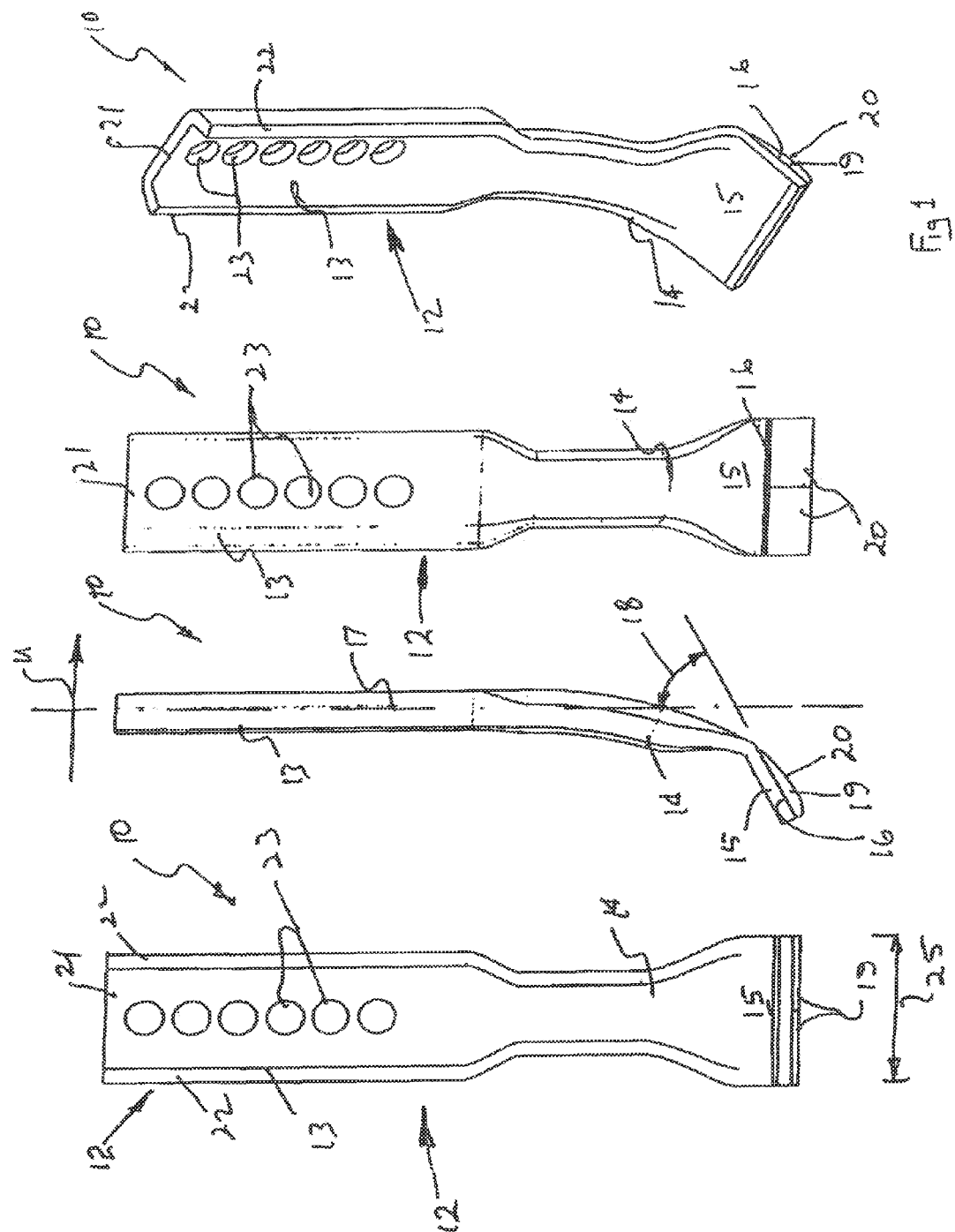

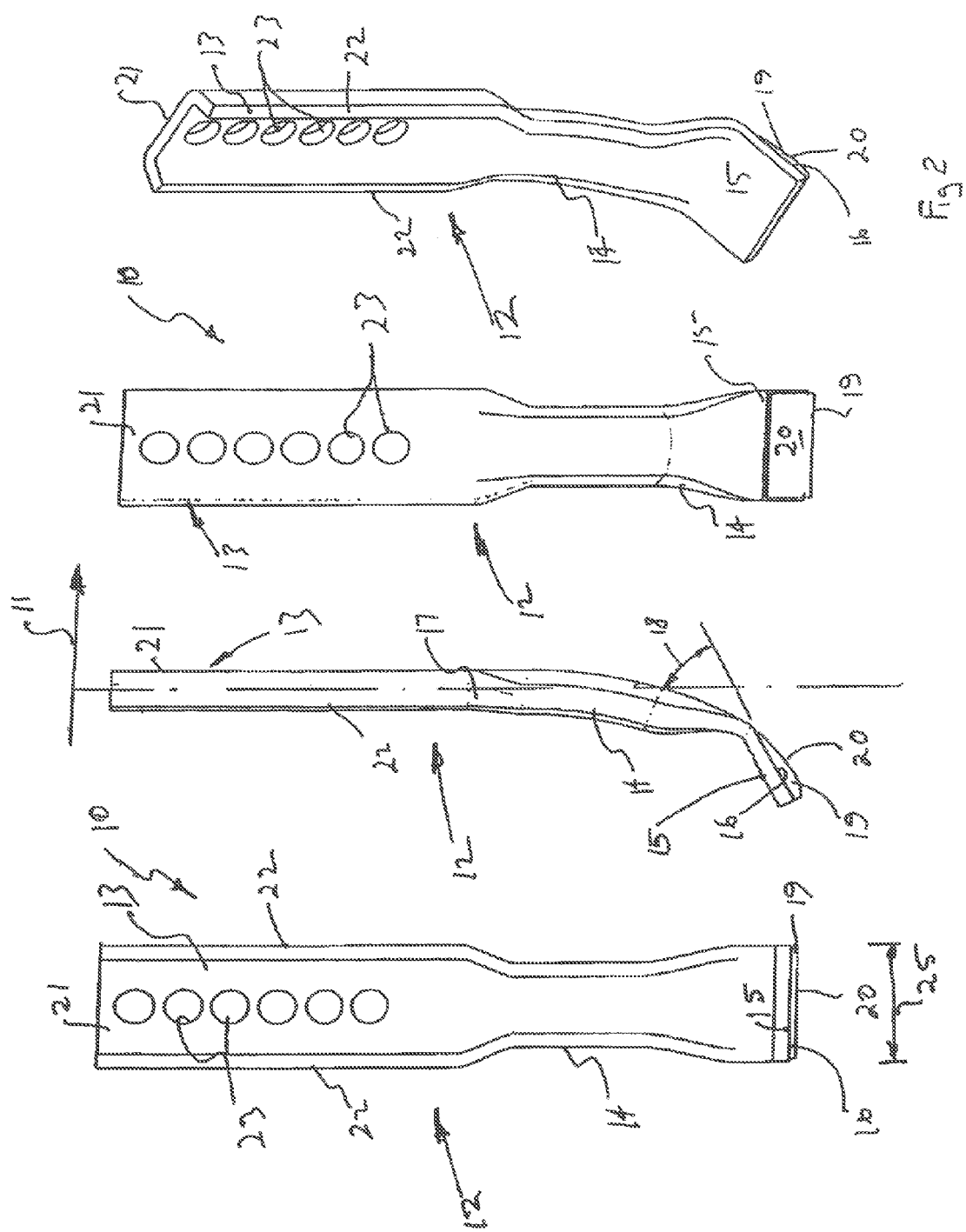

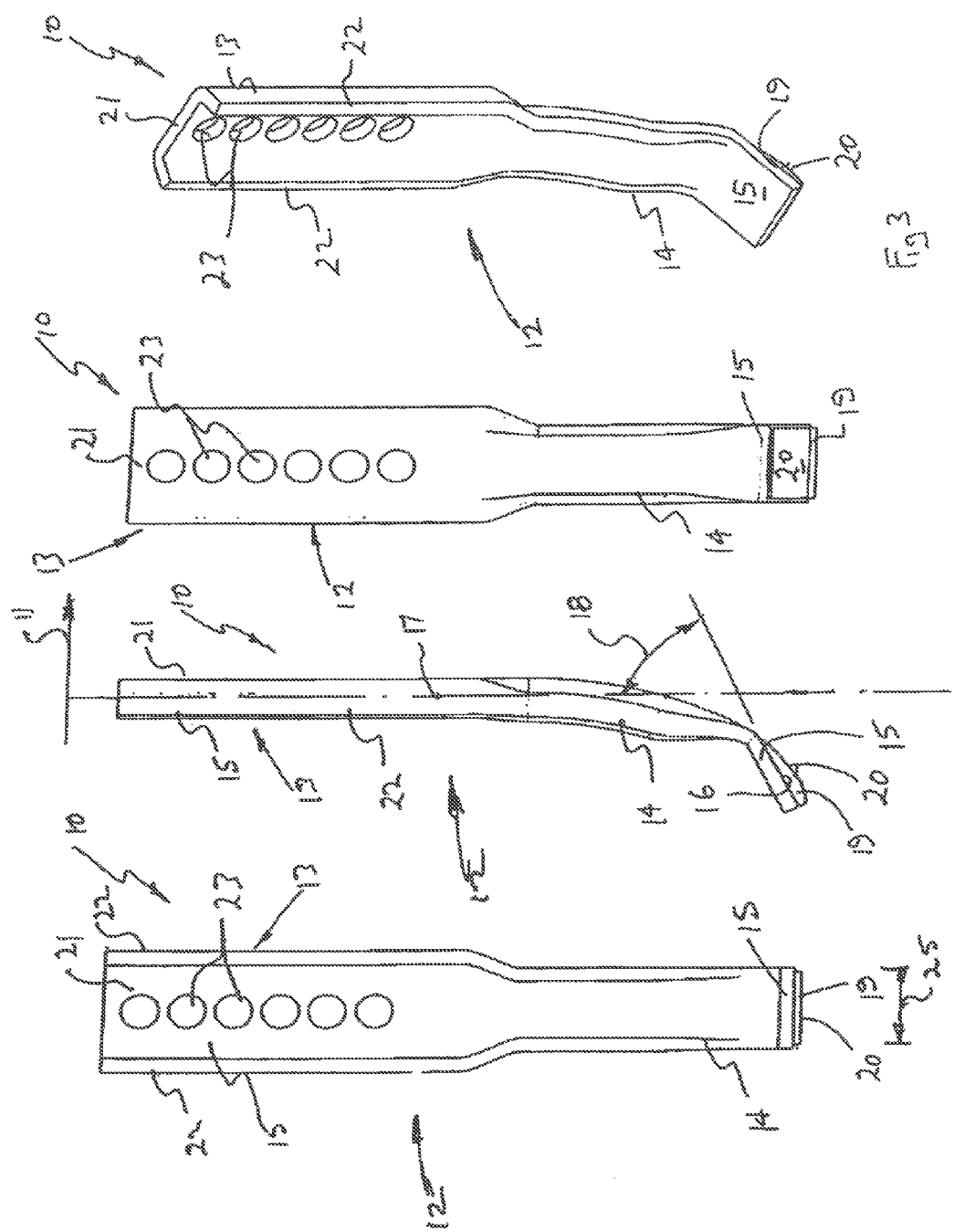

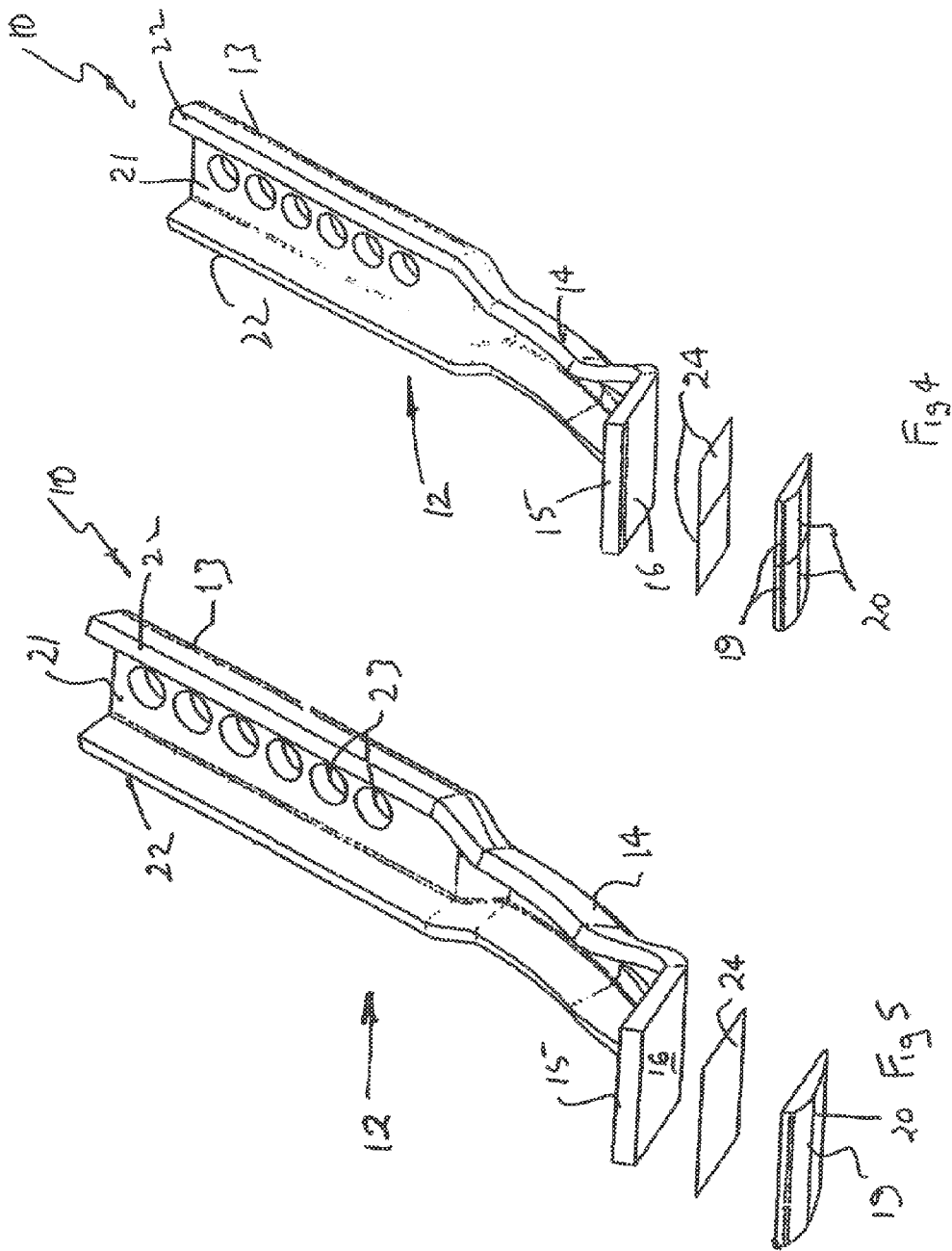

CLOSING TOOL

CROSS-REFERENCE TO RELATED APPLICATION

This application claims priority from Australian Patent Application Number AU 2010901352, filed Mar. 31, 2010, which is hereby incorporated herein by reference in its entirety.

TECHNICAL FIELD

The present invention relates to plough tools and more particularly but not exclusively to closing tools that are attached to a plough frame so as to aid in forming a seed bed behind the plough shank.

BACKGROUND OF THE INVENTION

Described in Australian Patent 675376 is a closing tool that is attached to a plough frame so as to close the soil behind the plough shank. The tool forms a seed bed at a desired depth to which a seed is delivered. Prior to the closing tool forming a seed bed, fertiliser is delivered to a slot in the soil at a position forward of the closing tool so that the closing tool moves soil to cover the fertiliser.

A disadvantage of the above discussed closing tool is that on occasions it can cause lateral displacement of the soil so that the fertiliser is not fully covered. The seed can then be exposed directly to the fertiliser. This can damage the seed. A further disadvantage is that lateral displacement of the soil does not provide for accurate location and/or formation of the seed bed.

OBJECT OF THE INVENTION

It is the object of the present invention to overcome or substantially ameliorate at least one of the above disadvantages.

SUMMARY OF THE INVENTION

There is disclosed herein a plough tool including:

a mounting stem via which the tool is supported so as to have an upper portion and a lower portion, the upper portion being provided so that the tool is supported by a plough frame and is moved in a forward direction thereby;

a flange fixed to the lower portion and extending downwardly and rearwardly therefrom so as to provide a lower surface inclined to the horizontal by an acute angle, said surface being generally planar; and a wear resistant member fixed to said surface so as to cover a substantial portion of said surface, said wear member having a convex downwardly facing surface that is to engage the soil when the tool is moved in said direction.

Preferably, said member is formed of a material that is harder than material from which said stem and flange are formed.

Preferably, said stem and flange are integrally formed.

Preferably, said stem has a longitudinal axis and said surface is inclined to said longitudinal axis by a forward facing angle of between 60° and 66°.

Preferably, when said stem is attached to a plougher frame for movement through a soil layer, said surface is inclined to the horizontal by an angle within the range of 20° to 35°.

Preferably, said wear resistant member is formed of tungsten.

Preferably, said tool includes a fixing layer located between said surface and said wear member securing the wear member to said surface.

Preferably, said layer is formed of solder.

Preferably, the tool is a closing tool.

BRIEF DESCRIPTION OF THE DRAWINGS

Preferred forms of the present invention will now be described by way of example with reference to the accompanying drawings wherein:

FIG. 1 illustrates a first closing tool in an isometric view, a front elevation view, a side elevation view and a rear elevation view;

FIG. 2 schematically depicts a second closing tool in an isometric view, a front elevation view, a side elevation view and a rear elevation view;

FIG. 3 schematically depicts a third closing tool in an isometric view, a front elevation view, a side elevation view and a rear elevation view;

FIG. 4 is a schematic parts exploded isometric view of the closing tool of FIG. 1; and FIG. 5 is a schematic parts exploded view of the closing tool of FIG. 2.

DETAILED DESCRIPTION OF THE PREFERRED EMBODIMENTS

In the accompanying drawings there is schematically depicted various closing tool 10.

One of the closing tools 10 will now be described. The closing tool 10 is intended to be attached to a plough frame so as to be moved in a forward direction 11 through a soil layer. A fuller description of the plougher frame and the location of the closing tools 10 is provided by Australian Patent 675376.

The closing tool 10 includes an attachment stem 12 via which the closing tool 10 is attached to a plough frame so as to extend downwardly from an upper portion 13 to a lower portion 14. Fixed to or secured to the lower portion 14 is a flange 15 that provides a lower surface 16 that is generally planar. The stem 12 has a longitudinal axis 17 with the surface 16 inclined to the axis 17 by a forward facing acute angle 18. Preferably the angle 18 is within the range of 60° to 66° and is more preferably 63°.

The flange 15 is downwardly and rearwardly extending from the lower portion 14.

Secured to the surface 16 is a wear resistant member 19 that has a convex downwardly facing surface 20 and that covers a substantial portion of the surface 16.

Preferably, the wear resistant member 19 is secured to the surface 16 by a securing layer 24.

Preferably, the wear resistant member 19 is formed of tungsten and the layer 24 a solder layer that is heated to secure the wear resistant member 19 to the surface 16.

Preferably the surface 16 when in use, passing through a soil layer in the direction 11, is inclined to the horizontal by an angle within the range 20° to 35°, more preferably 27°, 28° or 29°.

Preferably, the stem 12 and flange 15 are integrally formed, with the stem 12 and flange 15 being formed from a metal strip plastically deformed to the shapes as illustrated.

Preferably, the stem 12 has a forward facing centre strip 21 from which there rearwardly extends flanges 22.

As is best seen in the drawings, the centre portion 21 is provided with a plurality of holes 23 through which fasteners would pass to secure the closing tool 10 to a part fixed the plough frame.

The flange 15 of FIG. 1 has a width of 63 mm, the flange 15 of FIG. 2 about 47 mm, and the flange 15 of FIG. 3 about 33 mm.

An advantage of the above described closing tools 10 is the arcuate convex surface 20 that engages the soil and moves the soil to dose the slot while minimising lateral displacement of the soil. The slot is formed by a digging blade and tine associated with the closing tool 10. Accordingly the seed bed position is more accurately formed and the seed is less likely to be exposed to the fertiliser below. The member 19 engages the soil, and moves the soil but resists wear as it is formed of harder material than the stem 12 and flange 15. The member 19 may be one or more pieces of wear resistant material.

What is claimed is:

1. A plough closing tool including;
   a mounting stem via which the tool is supported so as to have an upper portion and a lower portion, the upper portion being provided so that the tool is supported by a plough frame and is moved in a forward direction thereby;
   a flange fixed to the lower portion and extending downwardly and rearwardly therefrom so as to provide a lower forwardly facing major surface inclined to the horizontal by an acute angle, said lower forwardly facing major surface being generally planar and extending downwardly and rearwardly relative to said lower portion; and
   a wear resistant member fixed to a substantially planar portion of said lower forwardly facing major surface so as to cover a substantial portion of said lower forwardly facing major surface, said wear member having a substantially planar upper surface and a convex downwardly facing wear surface that is to engage the soil when the tool is moved in said forward direction.

2. The tool of claim 1, wherein said member is formed of a material that is harder than material from which said stem and flange are formed.

3. The tool of claim 1, wherein said stem and flange are integrally formed.

4. The tool of claim 1, wherein said stem has a longitudinal axis and said lower forwardly facing major surface is inclined to said longitudinal axis by a forward facing angle of between 60° and 66°.

5. The tool of claim 1, wherein when said stem is attached to a plough frame for movement through a soil layer, said lower forwardly facing major surface is inclined to the horizontal by an angle within the range of 20° to 35°.

6. The tool of claim 1, wherein said wear resistant member is formed of tungsten.

7. The tool of claim 1, wherein said tool includes a fixing layer located between said surface and said wear member securing the wear member to said lower forwardly facing major surface.

8. The tool of claim 7, wherein said fixing layer is formed of solder.

9. The tool of claim 3, wherein said stem has a longitudinal axis and said lower surface is inclined to said longitudinal axis by a forward facing angle of between 60° and 66°.

10. The tool of claim 9, wherein said wear resistant member is formed of tungsten.

11. The tool of claim 10, wherein said tool includes a layer formed of solder between said surface and said wear member securing the wear member to said lower surface.

12. The tool of claim 11, wherein the tool is a closing tool.

13. The tool of claim 1, wherein said flange has a transverse width of about 33 mm to about 63 mm.

14. A plough closing tool including:
    a mounting stem via which the tool is supported so as to have an upper portion and a lower portion, the upper portion being provided so that the tool is supported by a plough frame and is moved in a forward direction thereby;
    a flange extending downwardly and rearwardly from the lower portion so as to provide a lower surface inclined to the horizontal by an acute angle, said stem and said flange being integrally formed, and said lower surface being generally planar; and
    a wear resistant member fixed to said lower surface so as to cover a substantial portion of said lower surface, said wear member having a substantially planar upper surface and a convex downwardly facing wear surface that is to engage the soil when the tool is moved in said forward direction.

15. The tool of claim 14, wherein said stem has a longitudinal axis and said lower surface is inclined to said longitudinal axis by a forward facing angle of between 60° and 66°.

16. The tool of claim 15, wherein when said stem is attached to a plougher frame for movement through a soil layer, said lower surface is inclined to the horizontal by an angle within the range of 20° to 35°.

17. The tool of claim 16, wherein said wear resistant member is formed of tungsten.

18. The tool of claim 17, wherein said tool includes a fixing layer located between said lower surface and said wear member securing the wear member to said surface.

19. The tool of claim 18, wherein said fixing layer is formed of solder.

20. The tool of claim 16, wherein said flange has a transverse width of about 33 mm to about 63 mm.

* * * * *